US011113452B2

(12) United States Patent
Yamada (10) Patent No.: US 11,113,452 B2
(45) Date of Patent: Sep. 7, 2021

(54) DOCUMENT MANAGEMENT APPARATUS, DOCUMENT MANAGEMENT SYSTEM, AND NON-TRANSITORY COMPUTER READABLE MEDIUM STORING PROGRAM (71) Applicant: FUJIFILM BUSINESS INNOVATION CORP., Tokyo (JP)

(72) Inventor: Toshifumi Yamada, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 151 days.

(21) Appl. No.: 16/152,772

(22) Filed: Oct. 5, 2018

(65) Prior Publication Data
US 2019/0121843 A1  Apr. 25, 2019

(30) Foreign Application Priority Data

Oct. 20, 2017 (JP) .............................. JP2017-203576

(51) Int. Cl.
*G06F 40/137* (2020.01)
*G06F 3/0484* (2013.01)
*G06F 40/166* (2020.01)
*G06F 40/14* (2020.01)
*G06F 40/197* (2020.01)
(Continued)

(52) U.S. Cl.
CPC .......... *G06F 40/137* (2020.01); *G06F 3/0484* (2013.01); *G06F 40/14* (2020.01); *G06F 40/166* (2020.01); *G06F 40/197* (2020.01); *G06F 3/0482* (2013.01)

(58) Field of Classification Search
CPC ...... G06F 40/166; G06F 40/14; G06F 40/137; G06F 40/197; G06F 3/0484; G06F 3/0482
See application file for complete search history.

(56) References Cited

U.S. PATENT DOCUMENTS

2014/0019852 A1*  1/2014  Numata ................ G06F 40/134
                                                715/255
2014/0258832 A1*  9/2014  Hepp .................... G06F 40/166
                                                715/234

(Continued)

FOREIGN PATENT DOCUMENTS

JP   H03-252763 A   11/1991
JP   2012-118591 A   6/2012
(Continued)

OTHER PUBLICATIONS

Jul. 6, 2021 Office Action issued in Japanese Patent Application No. 2017-203576.

*Primary Examiner* — Quoc A Tran
(74) *Attorney, Agent, or Firm* — Oliff PLC (57) ABSTRACT A document management apparatus includes a display, a specifying operation receiving part, and a notification controller. The display displays a document structure in which an edition element of a document to be edited is identifiable. The edition element is a portion of the document that serves as an element of editing work. The specifying operation receiving part receives an operation of specifying the edition element based on the document structure displayed on the display. The notification controller provides a notification to a notification destination associated with the edition element specified through the operation received by the specifying operation receiving part.

12 Claims, 10 Drawing Sheets

(51) Int. Cl.
*G06F 3/0482* (2013.01)
*G06F 17/00* (2019.01)

(56) References Cited

U.S. PATENT DOCUMENTS

2015/0301994 A1* 10/2015 Kobayashi ............ G06F 40/197
                                                                    715/229
2018/0232346 A1*  8/2018 Konnola .............. G06Q 10/101
2018/0314680 A1* 11/2018 Dorai ................... G06F 40/166

FOREIGN PATENT DOCUMENTS

JP          2012-150647 A    8/2012
JP              5222604 B2   6/2013

* cited by examiner

APPROVAL REQUEST - MESSAGE (XX FORMAT) — 1101

[SEND]

TO:
CC:
SUBJECT: APPROVAL REQUEST

1) PLEASE CONFIRM APPROVAL FOR BOOK_A → PART H1-1 → CHAPTER H2-1 → SECTION H3-1

1102 {
○ PLEASE CLICK URLs BELOW TO VIEW CHANGES
WEB PREVIEW : http://www.xxx.com/preview/web?Name125&version=3
PRINT PREVIEW : http://www.xxx.com/preview/pdf?Name125&version=3
DIFFERENCE VIEW (DIFFERENCE FROM PREVIOUS VERSION) : http://www.xxx.com/diff/previous?Name125&version=3
DIFFERENCE VIEW (DIFFERENCE FROM PREVIOUS APPROVED VERSION) : http://www.xxx.com/diff/previousapproved?Name125&version=3
}

1103 {
○ PLEASE CLICK URL BELOW TO CONFIRM APPROVAL
http://www.xxx.com/approve/version?Name125&version=3
}

2) PLEASE CONFIRM APPROVAL FOR BOOK_B → PART H1-1 → CHAPTER H2-2

1102 {
○ PLEASE CLICK URLs BELOW TO VIEW CHANGES
WEB PREVIEW : http://www.xxx.com/preview/web?Name225&version=1
PRINT PREVIEW : http://www.xxx.com/preview/pdf?Name225&version=1
DIFFERENCE VIEW (DIFFERENCE FROM PREVIOUS VERSION) : http://www.xxx.com/diff/previous?Name225&version=1
DIFFERENCE VIEW (DIFFERENCE FROM PREVIOUS APPROVED VERSION) : http://www.xxx.com/diff/previousapproved?Name225&version=1
}

1103 {
○ PLEASE CLICK URL BELOW TO CONFIRM APPROVAL
http://www.xxx.com/approve/version?Name225&version=1
}

DOCUMENT MANAGEMENT APPARATUS, DOCUMENT MANAGEMENT SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-203576 filed Oct. 20, 2017.

BACKGROUND (i) Technical Field

The present invention relates to a document management apparatus, a document management system, and a non-transitory computer readable medium storing a program.

(ii) Related Art

In a document management system in which plural users share electronic documents, when a document is edited, the users who share the document may be notified that the document has been edited or approval of a specific user may be requested for edited contents.

SUMMARY

According to an aspect of the invention, there is provided a document management apparatus including a display, a specifying operation receiving part, and a notification controller. The display displays a document structure in which an edition element of a document to be edited is identifiable. The edition element is a portion of the document that serves as an element of editing work. The specifying operation receiving part receives an operation of specifying the edition element based on the document structure displayed on the display. The notification controller provides a notification to a notification destination associated with the edition element specified through the operation received by the specifying operation receiving part.

BRIEF DESCRIPTION OF THE DRAWINGS

An exemplary embodiment of the present invention will be described in detail based on the following figures, wherein.

DETAILED DESCRIPTION

An exemplary embodiment of the present invention is described below in detail with reference to the accompanying drawings.

<Configuration of Document Management System>

Figure 1:
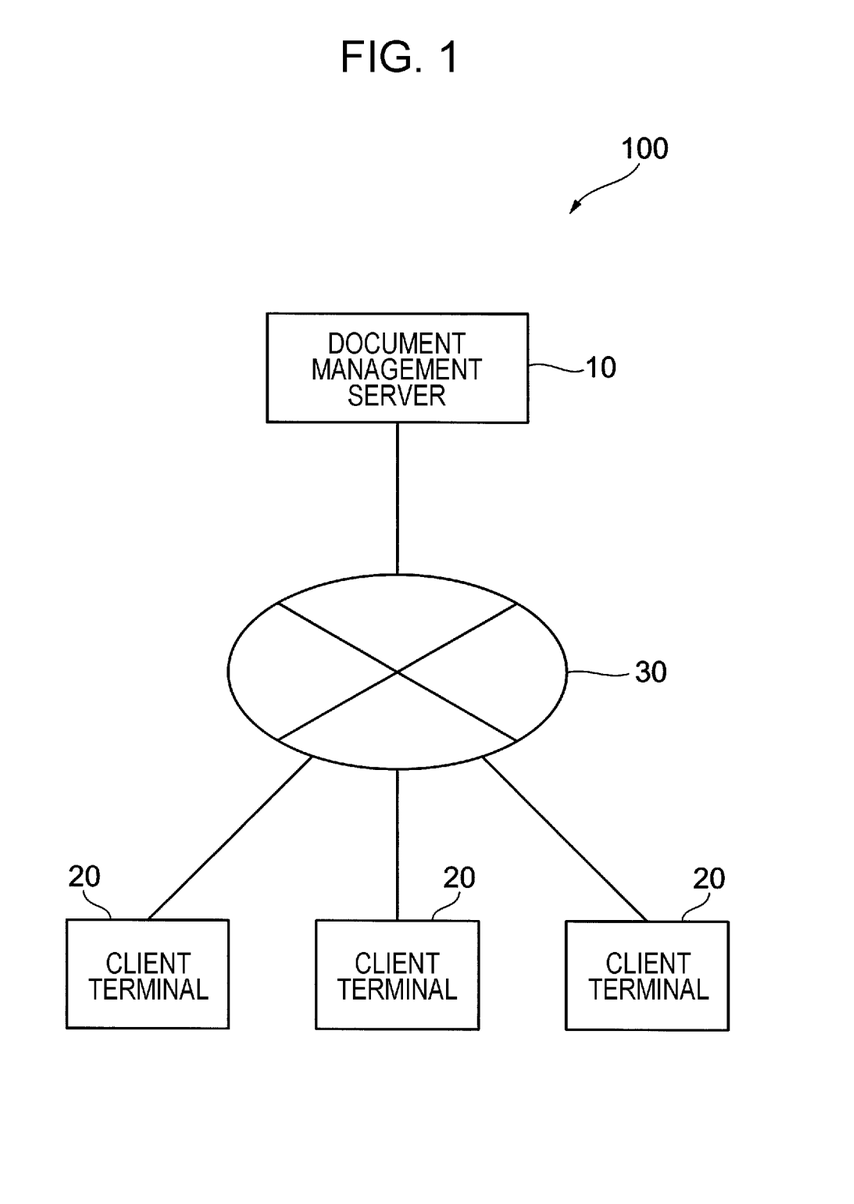
FIG. 1 illustrates the overall configuration of a document management system according to an exemplary embodiment.

FIG. 1 illustrates the overall configuration of a document management system according to this exemplary embodiment. A document management system 100 of this exemplary embodiment includes a document management server 10 that manages document files, and client terminals 20 to be used by users for accessing the document management server 10. The document management server 10 is connected to the client terminals 20 via a network 30. When approvers are individually assigned for elements constituting a document, such as a part, a chapter, and a section (edition elements) and when the document is edited, it is necessary to request an approver to confirm approval for each edition element in which the contents are edited. In the document management system of this exemplary embodiment, when a document file is edited, it is assumed that the edited document file is approved for each edition element. Details of the edition elements are described later.

The document management server 10 is a server that manages document files and information related to the document files. The document files managed by the document management server 10 are shared among plural users and may be edited by one or plural users. It is assumed that the edited document file is approved by a predetermined approver. The document management server 10 also manages approval statuses of the document files. The document management server 10 is an example of a document management unit. The document management server 10 is implemented by, for example, a computer. The document management server 10 may be configured by a single computer or may be implemented by distributed processing performed by plural computers.

The client terminal 20 is an information processing apparatus that is connected to the document management server 10 via the network 30 and is used for viewing or editing a document file. The client terminal 20 includes a display that displays the contents of a document file (document) and a document structure diagram that represents a document structure. The client terminal 20 has a function of requesting, when a document file is edited, approval for the edited document file in response to a user's operation. The client terminal 20 is an example of a specifying operation receiving unit and a notification controller. The client terminal 20 is implemented by, for example, a computer, a tablet information terminal, or other information processing apparatuses.

The network 30 is an information communication network that handles communication between the document management server 10 and the client terminal 20. The type of the network 30 is not particularly limited as long as data may be transmitted and received. For example, the network 30 may be the Internet, a local area network (LAN), or a wide area network (WAN). The communication line to be used for data communication may be wired or wireless. Apparatuses may be connected to each other via plural networks or communication lines.

<Functional Configuration of Document Management Server>

Figure 2:
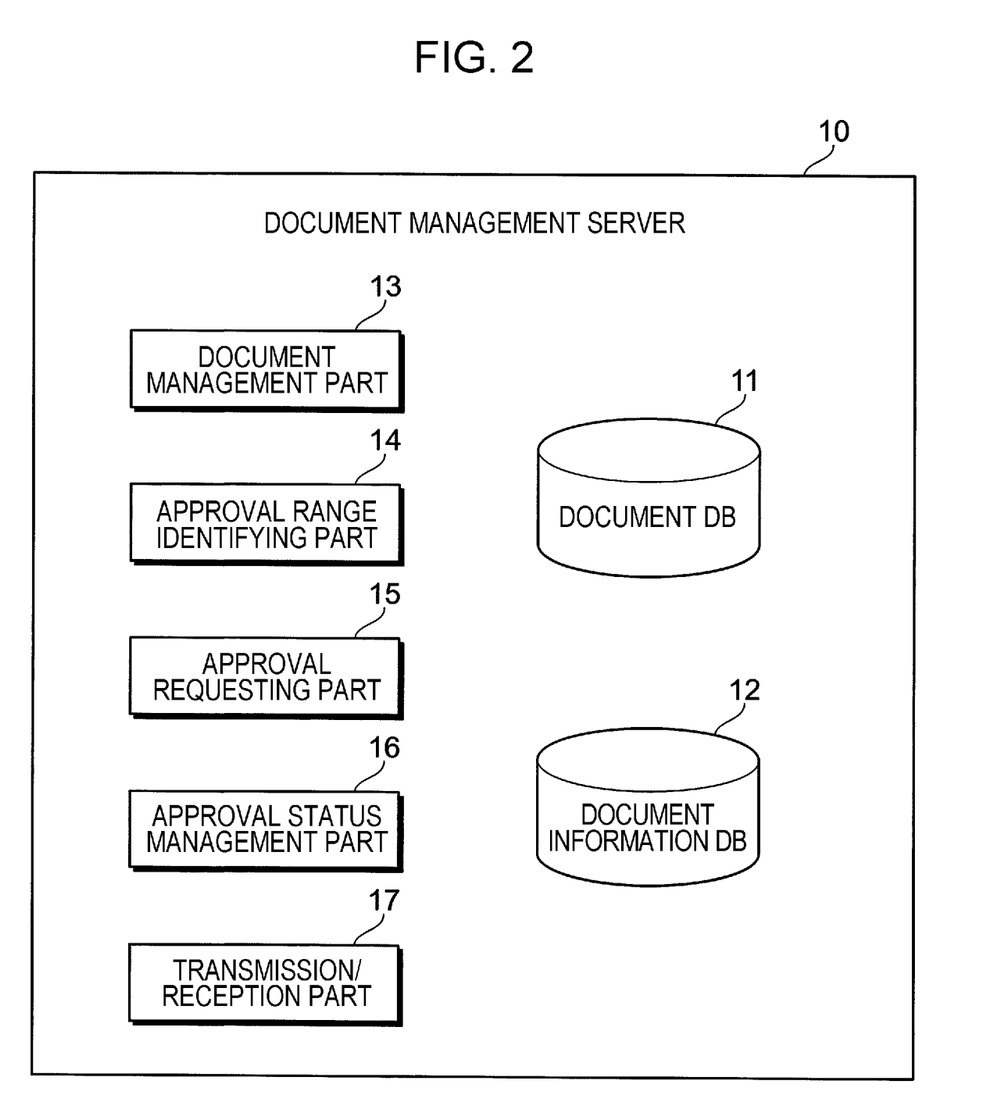
FIG. 2 illustrates the functional configuration of a document management server of the exemplary embodiment.

FIG. 2 illustrates the functional configuration of the document management server 10 of this exemplary embodiment. As illustrated in FIG. 2, the document management server 10 includes a document database (DB) 11, a document information database (DB) 12, a document management part 13, an approval range identifying part 14, an approval requesting part 15, an approval status management part 16, and a transmission/reception part 17.

The document DB 11 is a database that holds document files to be viewed or edited. In this exemplary embodiment, the document file to be edited is subjected to editing processing for each edition element. Thus, the document DB 11 manages each held document file for each edition element. The edition element is a preset portion constituting a document, such as a part, a chapter, or a section, and is an element to be subjected to editing work individually. When a document is structured hierarchically at multiple levels as in a case in which the document is constituted by plural parts, each part is constituted by one or plural chapters, and each chapter is constituted by one or plural sections, the edition elements may also be set at multiple levels. That is, for example, one chapter and one or plural sections included in this chapter are individual edition elements. When the edition elements of the document are structured hierarchically, the number of levels of hierarchy is not particularly limited. The edition elements of the document are not limited to the elements that are explicitly written in the document, such as the part, the chapter, and the section. For example, a paragraph and a sentence may be set as the edition elements. The document DB 11 may hold versions of edition along with editing work for the edition element of the document file.

The document information DB 12 is a database that holds information related to the document files held in the document DB 11 and documents in the document files (document information). The document information includes information indicating a relationship between edition elements. The information indicating a relationship between edition elements indicates a relationship between edition elements associated with each other based on the structure of a document. That is, the information indicating a relationship between edition elements indicates a document structure (document structure information). The information indicating a relationship between edition elements includes at least one of a positional relationship between edition elements and a link relationship between edition elements in the hierarchical structure of the document. For example, the document information DB 12 holds, as the information indicating a positional relationship between edition elements, information on an edition element placed at a higher level than a certain edition element, an edition element placed at a lower level than a certain edition element, and edition elements associated with the same edition element of an immediately higher level. For example, when a certain edition element has a link with another edition element in the same document or a different document, the document information DB 12 holds information indicating that the edition element of a source of the link is associated with the edition element of a destination of the link. The document information includes version information of each edition element. When plural versions are held in the document DB 11 for each edition element of the document file, the document information DB 12 holds information on timings of creation of the versions and information on editors.

The document management part 13 is a processing unit that manages the document files held in the document DB 11 and the document information held in the document information DB 12. In response to a request from the client terminal 20, the document management part 13 reads a document file and document information related to the request from the document DB 11 and the document information DB 12 and transmits the document file and the document information to the client terminal 20 that has given the request. When the document file (edition element) is edited in the client terminal 20, the document management part 13 receives the edited document file (edition element) from the client terminal 20 and stores the edited document file (edition element) in the document DB 11. The document management part 13 stores the document information related to the edited document file (edition element) in the document information DB 12.

The approval range identifying part 14 is a processing unit that identifies, when an approval request for a certain edition element is received from the client terminal 20, a range in which approval is requested together with this edition element (edition element that is a target of the approval request received from the client terminal 20; hereinafter referred to as a target edition element). The edition element (hereinafter referred to as a related edition element) within the range in which approval is requested together with the target edition element is identified in accordance with predetermined rules based on the information indicating a relationship between edition elements and the version information of each edition element, which are held in the document information DB 12. Details of the rules for identifying the related edition element are described later.

The approval requesting part 15 is a processing unit that requests approval for each edition element that requires approval. The approval requesting part 15 receives an approval request from the client terminal 20 and requests an approver of a target edition element to confirm approval for the target edition element. The approval requesting part 15 also requests an approver of each related edition element (edition element related to the target edition element) within the approval range identified by the approval range identifying part 14 to confirm approval for the related edition element. That is, in this exemplary embodiment, when a target edition element is identified and approval is requested, a related edition element that is related to the target edition element is added as an approval target (notification target). When the related edition element is identified in relation to the target edition element that is a target of the approval request, the approval requesting part 15 may inquire of the client terminal 20 that has requested approval for the target edition element about whether to request approval for the identified related edition element. The processing of requesting each approver to confirm approval by the approval requesting part 15 is performed by, for example, notifying the approver of the approval request. The notification of the approval request is provided to, for example, an information terminal (not illustrated) of the approver by a communication method using a network, such as electronic mail.

The approval status management part 16 is a processing unit that manages approval statuses of the document files held in the document DB 11 for respective edition elements. Specifically, the approval status management part 16 manages the approval statuses for the respective edition elements regarding whether the edition elements are approved or unapproved and whether approval is requested for an unapproved edition element. When plural versions are present in the same edition element, the approval status management part 16 manages the approval statuses for the respective versions.

The transmission/reception part 17 is a communication unit that exchanges data with an external apparatus. Specifically, the transmission/reception part 17 transmits a document file and document information to the client terminal 20 and receives an edited document file and an approval request from the client terminal 20. The transmission/reception part 17 transmits notifications of approval requests to information terminals of approvers of a target edition element and a related edition element that are targets of the approval requests and receives approval results. The transmission/reception part 17 transmits, to the client terminal 20 that has requested approval, a command to inquire whether to request approval for the related edition element that is related to the target edition element and receives a response to the inquiry.

<Functional Configuration of Client Terminal>

Figure 3:
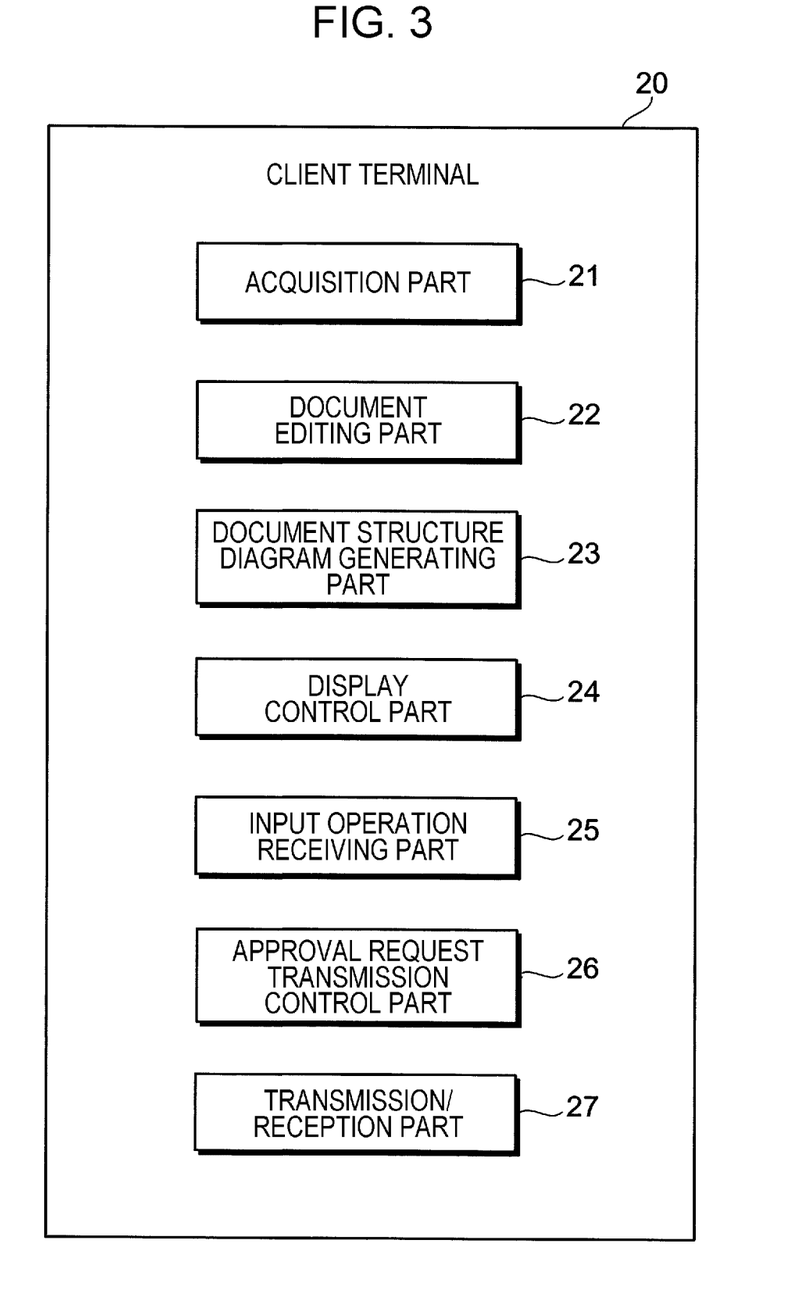
FIG. 3 illustrates the functional configuration of a client terminal of the exemplary embodiment.

FIG. 3 illustrates the functional configuration of the client terminal 20 of this exemplary embodiment. The client terminal 20 includes an acquisition part 21, a document editing part 22, a document structure diagram generating part 23, a display control part 24, an input operation receiving part 25, an approval request transmission control part 26, and a transmission/reception part 27.

The acquisition part 21 is a processing unit that acquires a document file and document information from the document management server 10. The acquisition part 21 specifies a document file to be viewed or edited and acquires the document file from the document management server 10. The acquisition part 21 acquires, together with the specified document file, document information related to the document file from the document management server 10.

The document editing part 22 is a processing unit that edits a document in the document file acquired by the acquisition part 21. The document editing part 22 receives a user's editing operation and edits the document file to be edited. It is assumed that the document file is edited for each edition element. For example, when a text included in an edition element is partially edited, this operation is handled as an editing operation for this edition element. When an editing operation is performed over plural edition elements, this editing operation is handled as being performed for each of the plural corresponding edition elements. The editing operation includes not only an operation of inputting, deleting, or rewriting a text in an edition element constituting a document, such as a part, a chapter, or a section, but also an operation of adding or deleting a lower-level edition element to or from a certain edition element. As an example of the latter case, an operation of adding or deleting a section to or from a certain chapter is an editing operation for this chapter.

The document structure diagram generating part 23 is a processing unit that generates a document structure diagram that represents document structure information of a document file to be viewed or edited. The document structure diagram generating part 23 extracts document structure information of the document file from the document information acquired by the acquisition part 21 and generates a document structure diagram based on the extracted document structure information. The document structure diagram may be, for example, a tree diagram (document structure diagram in a tree view). When the tree diagram is used as the document structure diagram, each edition element is represented by a node and a relationship between edition elements is represented by an edge between nodes. The document structure diagram may include information on an approval status of each edition element. When the contents of an edition element are edited by the document editing part 22, a change in the approval status or the version based on an edition result may be reflected in the document structure diagram.

Figure 4:
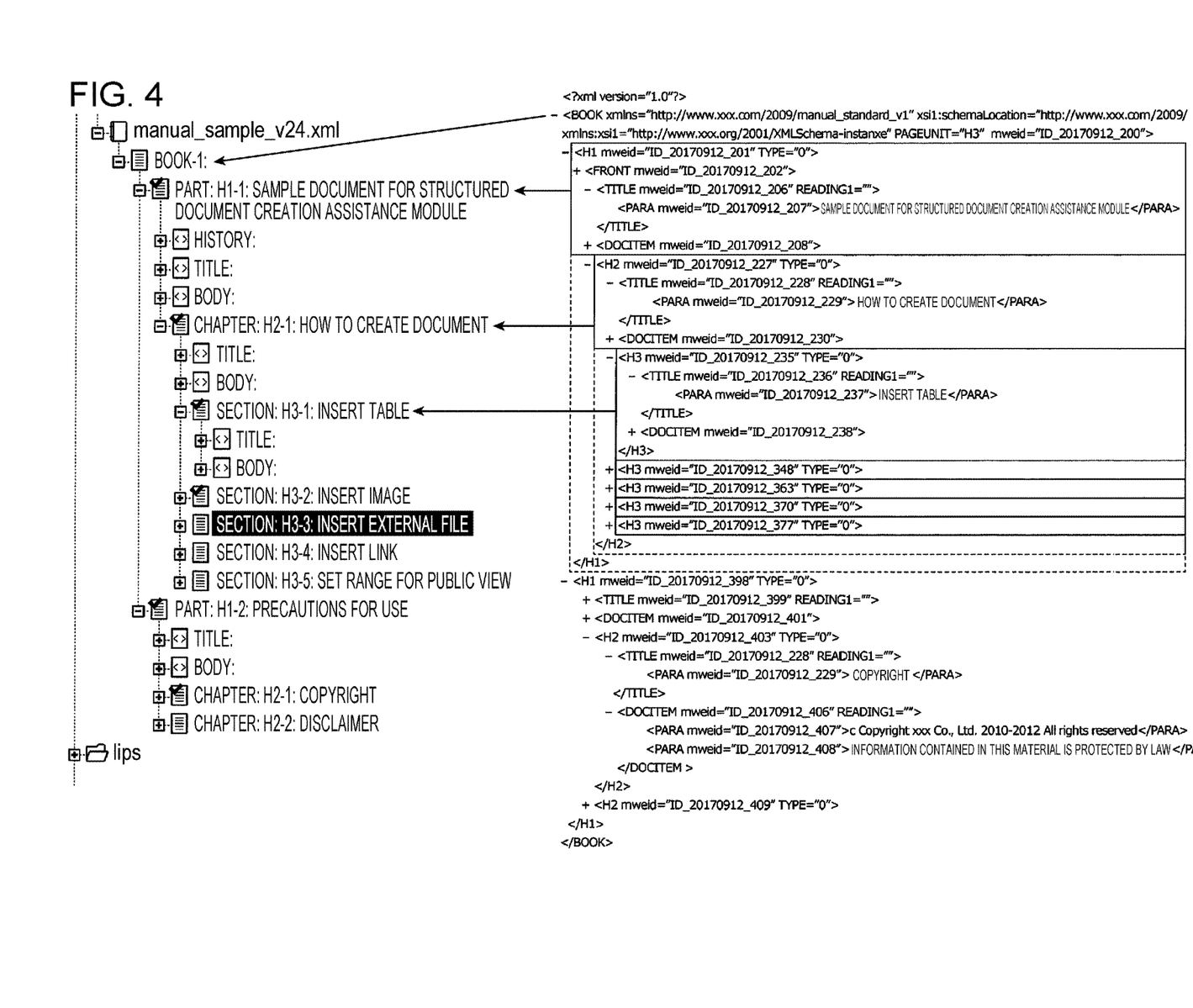
FIG. 4 illustrates a correspondence relationship between a document structure diagram in a tree view (tree diagram) and a document file.

FIG. 4 illustrates a correspondence relationship between a document structure diagram in a tree view (tree diagram) and a document file. As illustrated in FIG. 4, the document structure diagram represents a document structure of the document file in a tree view. In the illustrated example, correspondence indicated by an arrow shows that the entire document file ranging from <BOOK xmlns= . . . > to </BOOK> is represented by a node "BOOK-1". A portion of the document file that is defined in a range from <H1 mweid="ID_20170912_201" TYPE="0"> to </H1> is represented by a node "PART: H1-1". A portion of the document file that is defined in a range from <H2 mweid="ID_20170912_227" TYPE="0"> to </H2> is represented by a node "CHAPTER: H2-1". A portion of the document file that is defined in a range from <H3 mweid="ID_20170912_235" TYPE="0"> to </H3> is represented by a node "SECTION: H3-1". Although correspondence is not explicitly indicated by arrows, portions of the document file corresponding to a part, a chapter, and a section are similarly represented by nodes "PART: H1-2", "CHAPTER: H2-1", "CHAPTER: H2-2", and "SECTION: H3-2" to "SECTION: H3-5". The portions of the document file that are represented by the nodes in the tree diagram correspond to edition elements. The nodes in the tree diagram are connected to each other by edges that reflect the document structure of the document file.

The display control part 24 is a controller that controls displaying of the document structure diagram generated by the document structure diagram generating part 23. The display control part 24 displays the document structure diagram generated by the document structure diagram generating part 23 on a display device provided in (or connected to) the client terminal 20. The display control part 24 and the display device are examples of a display. The display control part 24 may display an indication of an approval status of each edition element in the document structure diagram. For example, when the tree diagram is used, a mark indicating an approval status may be assigned to each node. When plural versions are present in the same edition element, the display control part 24 may display an indication of the versions of each edition element in the document structure diagram.

In the tree diagram illustrated in FIG. 4, a check mark is displayed for a node corresponding to an approved edition element as the mark indicating an approval status of an edition element. Referring to the tree diagram of FIG. 4, the check marks are assigned to the nodes "PART: H1-1", "CHAPTER: H2-1", "SECTION: H3-1", and "SECTION: H3-2" but are not assigned to the nodes "BOOK-1", "SECTION: H3-3" to "SECTION: H3-5", and "CHAPTER: H2-2". The node with the check mark indicates that the approval status of the edition element corresponding to the node is "approved". The node without the check mark indicates that the approval status of the edition element corresponding to the node is "unapproved". For example, when the edition element corresponding to the node "SECTION: H3-3" is approved, the check mark is assigned to the node "SECTION: H3-3". For example, when the contents of the node "CHAPTER: H2-1" are edited to become a state in which approval is newly required ("unapproved"), the check mark disappears from the node "CHAPTER: H2-1".

In the tree diagram illustrated in FIG. 4, the title of the node "SECTION: H3-3" among the nodes corresponding to the "unapproved" edition elements is reversed in color. The node whose title is reversed in color indicates that the approval status of the edition element corresponding to the node is "approval requested". Thus, when the edition element corresponding to the node "SECTION: H3-3" is approved in response to the approval request, the check mark is assigned to the node "SECTION: H3-3" and the reversal in color of the node title turns back to a normal indication (display format indicating that the approval status is "approved").

Although illustration is not explicitly made in FIG. 4, when plural versions are present in each edition element, information on the latest version or information indicating how many edition elements have different versions may be displayed in the document structure diagram. The versions of the edition element having plural versions may be displayed as individual nodes. In this case, it is conceivable, for example, that the nodes or the node titles are displayed in different display formats for the respective versions.

When a link relationship is set between edition elements (for example, when a command is set so as to jump from one edition element to another or so as to make a reference to the contents of a different edition element in a certain edition element), the link relationship may be displayed in the document structure diagram. Specifically, for example, when the tree diagram is used as the document structure diagram, the edition elements having the link relationship may be displayed so as to be connected to each other by a special edge different from the edge that represents the tree structure or by a line prepared separately from the edge.

The display control part 24 displays the document file acquired by the acquisition part 21 on the display device. The user may view the document file displayed on the display device or edit the document file displayed on the display device by using an input device such as a keyboard.

The display control part 24 may display an inquiry screen (confirmation view) on the display device in response to a command that is received from the document management server 10 and is made to inquire whether to request approval for a related edition element that is related to a target edition element. Thus, the approval requesting part 15 of the document management server 10 and the display control part 24 of the client terminal 20 are examples of a confirmation unit.

The input operation receiving part 25 is a processing unit that receives a user's operation for the document file acquired by the acquisition part 21. Specifically, the input operation receiving part 25 receives an operation of requesting approval for an unapproved edition element of the document file. As the operation of requesting approval, the user specifies a node corresponding to an edition element that is a target of an approval request by using the document structure diagram displayed on the display device and performs an operation for requesting approval for the edition element corresponding to the node. The input operation receiving part 25 is an example of a specifying operation receiving part. When the document file is displayed on the display device, the input operation receiving part 25 receives a user's editing operation for the document file. As the editing operation, the user inputs, deletes, or rewrites a text in the document file displayed on the display device or adds or deletes an edition element.

The approval request transmission control part 26 is a controller that transmits an approval request for an edition element of a document file to the document management server 10. Specifically, when the input operation receiving part 25 has received an operation of requesting approval, the approval request transmission control part 26 transmits a command for the received approval request to the document management server 10. With this command, the document management server 10 notifies an approver of the approval request. Thus, the approval request transmission control part 26 is an example of a notification controller.

The transmission/reception part 27 is a communication unit that exchanges data with an external apparatus. Specifically, the transmission/reception part 27 receives a document file and document information from the document management server 10 and transmits a command for an approval request and an edited document file to the document management server 10. The transmission/reception part 27 receives, from the document management server 10, a command to inquire whether to request approval for a related edition element that is related to a target edition element and transmits a response to the inquiry.

<Hardware Configuration of Computer>

Figure 5:
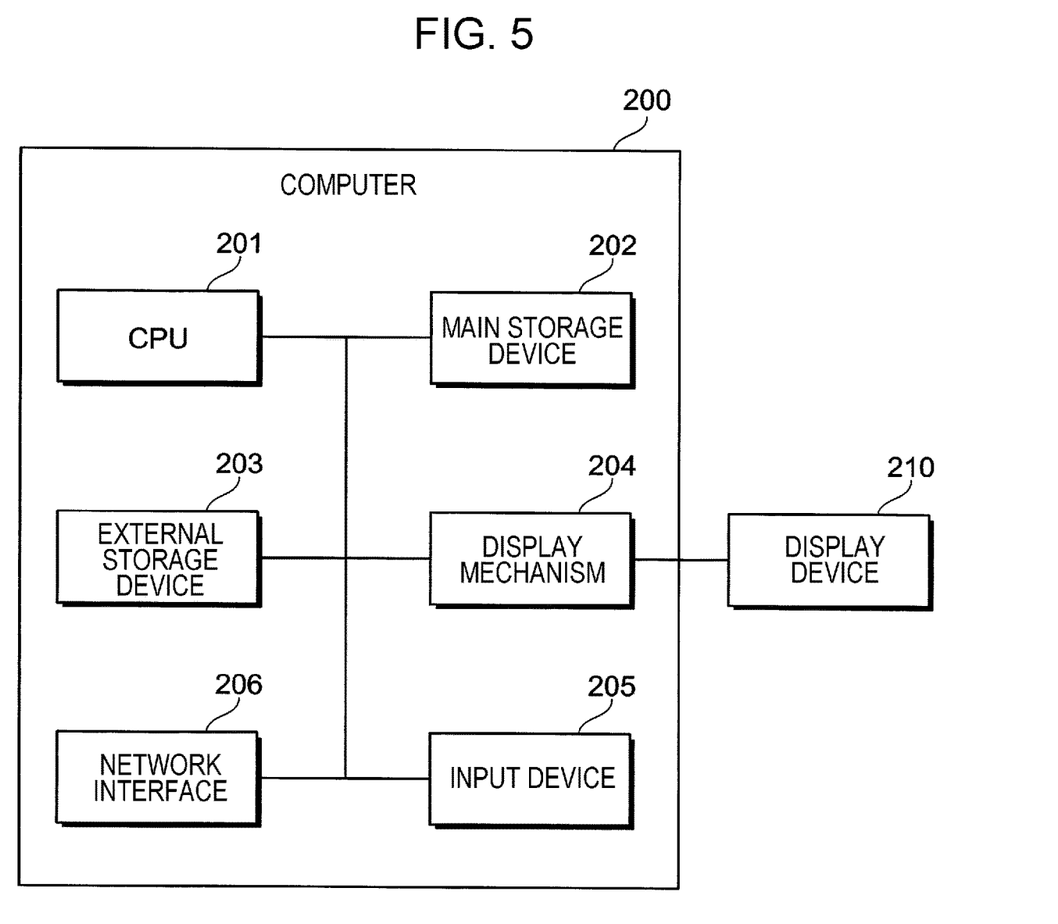
FIG. 5 illustrates an example of the hardware configuration of a computer to be used as each of the document management server and the client terminal.

FIG. 5 illustrates an example of the hardware configuration of a computer to be used as each of the document management server 10 and the client terminal 20. A computer 200 illustrated in FIG. 5 includes a central processing unit (CPU) 201 serving as a computation unit, and a main storage device (main memory) 202 and an external storage device 203 each serving as a memory. The CPU 201 executes a program stored in the external storage device 203 by reading the program in the main storage device 202. Examples of the main storage device 202 to be used include a random access memory (RAM). Examples of the external storage device 203 to be used include a magnetic disk drive and a solid state drive (SSD). The computer 200 further includes a display mechanism 204 for display output to a display device (display) 210, and an input device 205 to be used by an operator of the computer 200 for performing an input operation. Examples of the input device 205 to be used include a keyboard and a mouse. The computer 200 further includes a network interface 206 for connection to a network. The configuration of the computer 200 illustrated in FIG. 5 is merely an example and the computer that is used in this exemplary embodiment is not limited to the example of the configuration of FIG. 5. For example, the computer 200 may include, as the storage device, a non-volatile memory such as a flash memory or a read only memory (ROM).

When the document management server 10 illustrated in FIG. 2 is implemented by the computer illustrated in FIG. 5, each of the document database (DB) 11 and the document information database (DB) 12 is implemented by, for example, the main storage device 202 or the external storage device 203. The functions of the document management part 13, the approval range identifying part 14, the approval requesting part 15, and the approval status management part 16 are implemented, for example, such that the CPU 201 executes a program. The transmission/reception part 17 is implemented by, for example, the network interface 206.

When the client terminal 20 illustrated in FIG. 3 is implemented by the computer illustrated in FIG. 5, the functions of the acquisition part 21, the document editing part 22, the document structure diagram generating part 23, and the approval request transmission control part 26 are implemented, for example, such that the CPU 201 executes a program. The display control part 24 is implemented by, for example, the display mechanism 204. The input operation receiving part 25 is implemented by, for example, the input device 205 and the CPU 201. The transmission/reception part 27 is implemented by, for example, the network interface 206.

<Operation of Requesting Approval>

Figure 6:
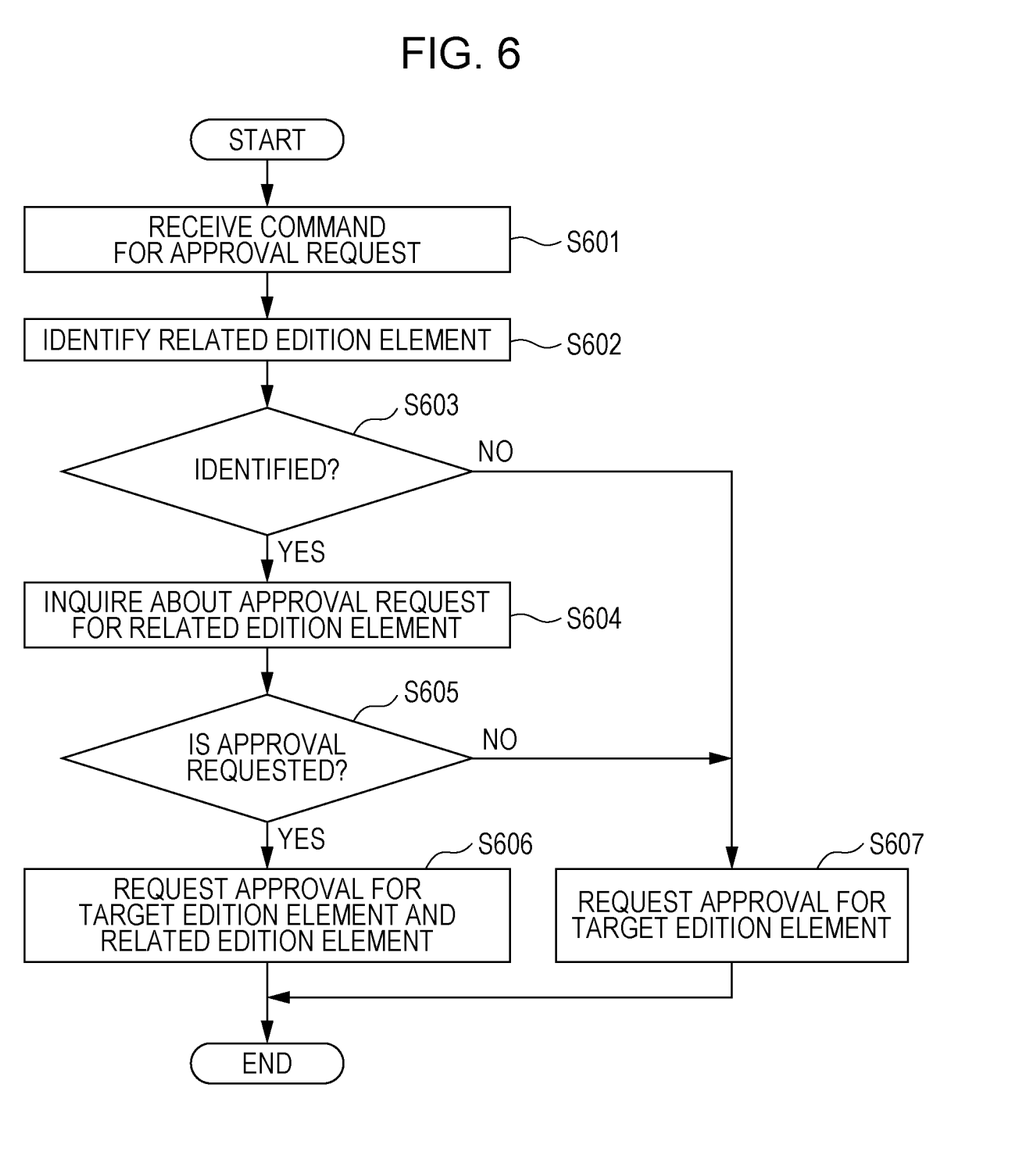
FIG. 6 is a flowchart illustrating an operation of requesting approval by the document management server.

FIG. 6 is a flowchart illustrating an operation of requesting approval by the document management server 10. As illustrated in FIG. 6, when the document management server 10 has received a command for an approval request from the client terminal 20 (S601), the approval range identifying part 14 of the document management server 10 identifies, in accordance with predetermined rules, a related edition element that is related to a target edition element that is a target of the approval request of the command (S602).

When the related edition element is identified (YES in S603), the approval requesting part 15 of the document management server 10 inquires of the client terminal 20 about whether to request approval for the identified related edition element together with the target edition element (S604). When a response indicating that approval is requested for the related edition element is received from the client terminal 20 (YES in S605), the approval requesting part 15 requests (notifies) approvers to confirm approval for the target edition element and the related edition element (S606).

When the related edition element is not identified because an edition element corresponding to the related edition element is not present (NO in S603), the approval requesting part 15 requests (notifies) an approver to confirm approval for the target edition element alone (S607). When the related edition element is identified but the response indicating that approval is requested for the related edition element is not received from the client terminal 20 (NO in S605), the approval requesting part 15 similarly requests (notifies) the approver to confirm approval for the target edition element alone (S607).

<Example of Rules for Identifying Approval Range (Related Edition Element)>

Next, the rules for identifying an approval range (related edition element) (hereinafter referred to as identification rules) are described taking specific examples. Examples of the identification rules to be used include a positional relationship between edition elements in a document structure and a link relationship between edition elements. As an example of the identification rule of the former case, the following rules are conceivable.

Rule 1: An edition element placed at a lower level than a target edition element is included in the approval range.
Rule 2: An edition element placed at a higher level than a target edition element is included in the approval range.

As an example of the identification rule of the latter case, the following rule is conceivable.

Rule 3: An edition element having a link with a target edition element is included in the approval range.

In Rule 3, the edition element of a destination of the link is not limited to an edition element of the same document file as that of the target edition element but may be an edition element of a different document file. Among the edition elements included in the approval range, an edition element whose approval status is "unapproved" and whose approval has not been requested is the related edition element.

Figure 7:
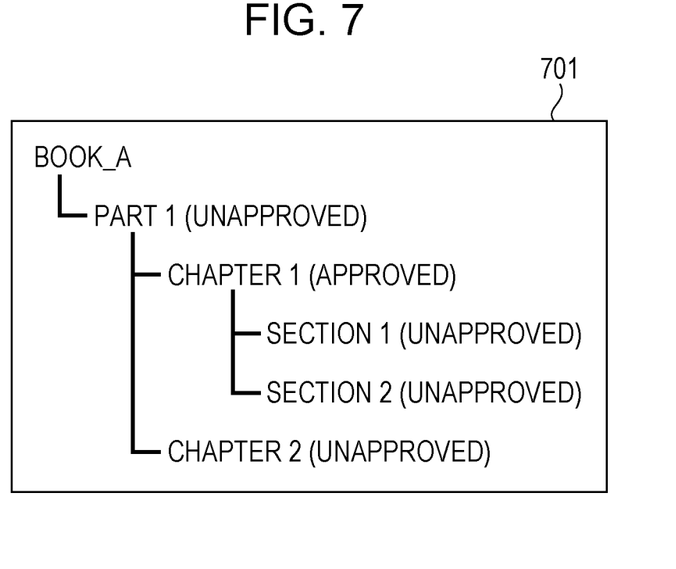
FIG. 7 illustrates an example of the document structure diagram, for describing identification rules based on a positional relationship between edition elements in the document structure.

FIG. 7 illustrates an example of the document structure diagram, for describing the identification rules based on the positional relationship between the edition elements in the document structure. According to a document structure diagram 701 illustrated in FIG. 7, a document file "BOOK_A" has one part that is "PART 1", "PART 1" has two chapters that are "CHAPTER 1" and "CHAPTER 2", and "CHAPTER 1" has two sections that are "SECTION 1" and "SECTION 2". "CHAPTER 1" is approved and "PART 1", "SECTION 1", "SECTION 2", and "CHAPTER 2" are unapproved. It is assumed that approval has not been requested for all the unapproved edition elements.

It is assumed that "PART 1" is specified as a target edition element. When Rule 1 is applied in this case, edition elements placed at lower levels than "PART 1" are included in the approval range. Referring to FIG. 7, all of "CHAPTER 1", "SECTION 1", "SECTION 2", and "CHAPTER 2" are placed at lower levels than "PART 1" and are included in the approval range. Among the edition elements included in the approval range, "SECTION 1", "SECTION 2", and "CHAPTER 2" that are unapproved edition elements are identified as related edition elements. "CHAPTER 1" is not the related edition element because "CHAPTER 1" is approved. As described above, when the related edition elements are identified, the approval requesting part 15 of the document management server 10 inquires whether to request approval for the identified related edition elements as well. Specifically, an inquiry command for approval requests that is issued by the approval requesting part 15 is transmitted from the document management server 10 to the client terminal 20 and the display control part 24 of the client terminal 20 displays an inquiry screen on the display device.

Figure 8:
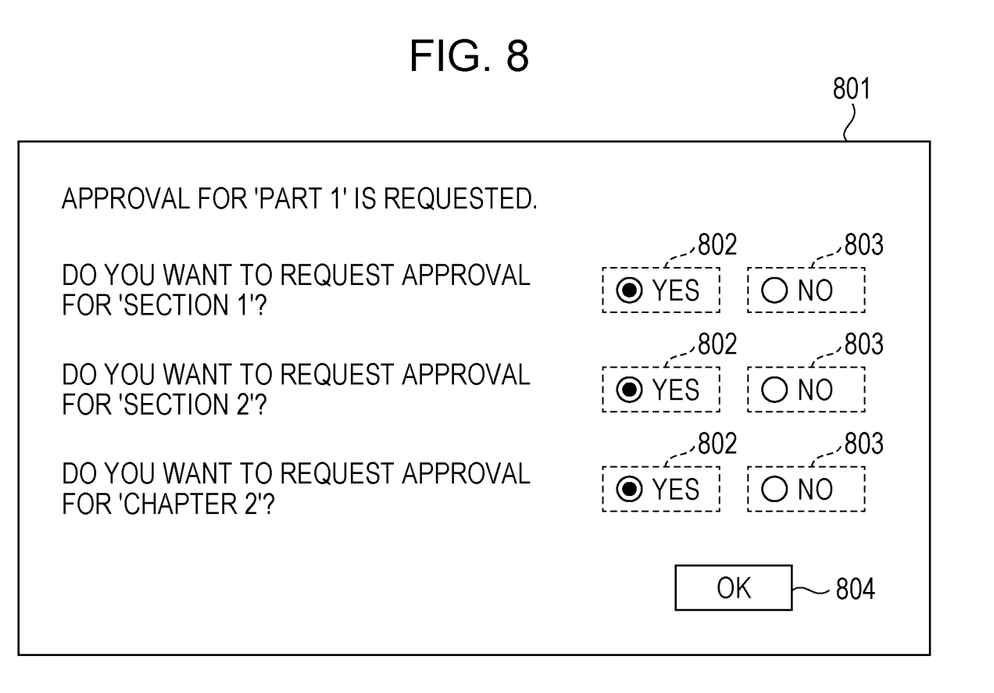
FIG. 8 illustrates an example of an inquiry screen about approval requests for related edition elements.

FIG. 8 illustrates an example of the inquiry screen about the approval requests for the related edition elements. A message indicating the target edition element: "APPROVAL FOR 'PART 1' IS REQUESTED." and messages indicating inquiries about whether to request approval for the related edition elements: "DO YOU WANT TO REQUEST APPROVAL FOR 'SECTION 1'?", "DO YOU WANT TO REQUEST APPROVAL FOR 'SECTION 2'?", and "DO YOU WANT TO REQUEST APPROVAL FOR 'CHAPTER 2'?" are displayed in an inquiry screen 801 illustrated in FIG. 8. Buttons 802, 803, and 804 to be used for issuing commands about whether to request approval for the related edition elements are displayed in the inquiry screen illustrated in FIG. 8. The user selects the button 802 for a related edition element whose approval is requested, selects the button 803 for a related edition element whose approval is not requested, and finally selects the "OK" button 804. Thus, a response indicating that approval is requested for the related edition element for which the button 802 is selected is transmitted from the client terminal 20 to the document management server 10.

Referring back to FIG. 7, it is assumed that "CHAPTER 2" is specified as a target edition element. When Rule 2 is applied in this case, edition elements placed at higher levels than "CHAPTER 2" are included in the approval range. Referring to FIG. 7, "PART 1" is placed at a higher level than "CHAPTER 2" and is included in the approval range. "PART 1" is identified as a related edition element because "PART 1" is unapproved. Although illustration is not particularly made, also in this case, an inquiry screen about whether to request approval for "PART 1" that is the related edition element is displayed and the user's selection is received similarly to the example described above.

Figure 9:
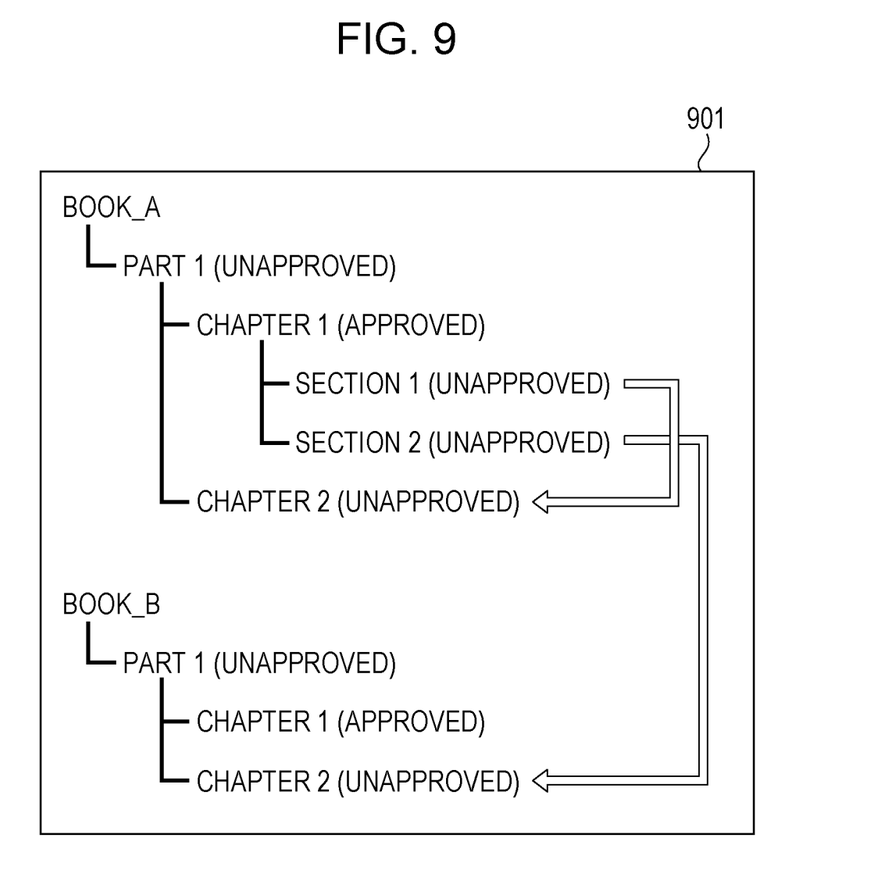
FIG. 9 illustrates another example of the document structure diagram, for describing an identification rule based on a link relationship between edition elements.

FIG. 9 illustrates another example of the document structure diagram, for describing the identification rule based on the link relationship between the edition elements. In a document structure diagram 901 illustrated in FIG. 9, the structure of a document file "BOOK_A" and approval statuses of edition elements are similar to those of the document file "BOOK_A" illustrated in FIG. 7. A document file "BOOK_B" has one part that is "PART 1" and "PART 1" has two chapters that are "CHAPTER 1" and "CHAP- TER 2". "CHAPTER 1" is approved and "PART 1" and "CHAPTER 2" are unapproved. It is assumed that approval has not been requested for all the unapproved edition elements. "SECTION 1" of "CHAPTER 1" of "BOOK_A" has a link relationship with "CHAPTER 2". "SECTION 2" of "CHAPTER 1" of "BOOK_A" has a link relationship with "CHAPTER 2" of "BOOK_B". In the document structure diagram 901 illustrated in FIG. 9, the link relationship between the edition elements is indicated by an outline arrow.

It is assumed that "SECTION 1" of "BOOK_A" is specified as a target edition element. When Rule 3 is applied in this case, edition elements having a link relationship with "SECTION 1" are included in the approval range. Referring to FIG. 9, "CHAPTER 2" of "BOOK_A" has a link relationship with "SECTION 1" and is included in the approval range. "CHAPTER 2" of "BOOK_A" is identified as a related edition element because "CHAPTER 2" of "BOOK_A" is unapproved. Although illustration is not particularly made, also in this case, an inquiry screen about whether to request approval for "CHAPTER 2" of "BOOK_A" that is the related edition element is displayed and the user's selection is received similarly to the example described above. The link relationship between "SECTION 1" and "CHAPTER 2" of "BOOK_A" may be a link from "SECTION 1" to "CHAPTER 2" or from "CHAPTER 2" to "SECTION 1".

It is assumed that "SECTION 2" of "BOOK_A" is specified as a target edition element. When Rule 3 is applied in this case, edition elements having a link relationship with "SECTION 2" are included in the approval range. Referring to FIG. 9, "CHAPTER 2" of "BOOK_B" has a link relationship with "SECTION 2" of "BOOK_A" and is included in the approval range. "CHAPTER 2" of "BOOK_B" is identified as a related edition element because "CHAPTER 2" of "BOOK_B" is unapproved. The approval range based on the link relationship extends over document files different from the document file to which the target edition element belongs and therefore "CHAPTER 2" of "BOOK_B" is the related edition element. Although illustration is not particularly made, also in this case, an inquiry screen about whether to request approval for "CHAPTER 2" of "BOOK_B" that is the related edition element is displayed and the user's selection is received similarly to the example described above. The link relationship between "SECTION 2" of "BOOK_A" and "CHAPTER 2" of "BOOK_B" may be a link from "SECTION 2" of "BOOK_A" to "CHAPTER 2" of "BOOK_B" or from "CHAPTER 2" of "BOOK_B" to "SECTION 2" of "BOOK_A".

Next, description is made of identification of a related edition element in a case in which plural edition elements having different versions are present in the same edition element on the document structure. It is assumed that the plural edition elements having different versions are unapproved and approval is requested for an edition element whose version is not the latest version. Taking a specific example, it is assumed that approval is required in order to disclose a document to public view but the contents of an edition element of the latest version will further be edited and therefore the previous version is disclosed to public view as an approved version. When the document is edited for each edition element in this case, it is necessary to identify an approval range and a related edition element in consideration of timings when the contents of the edition elements are edited.

Figure 10:
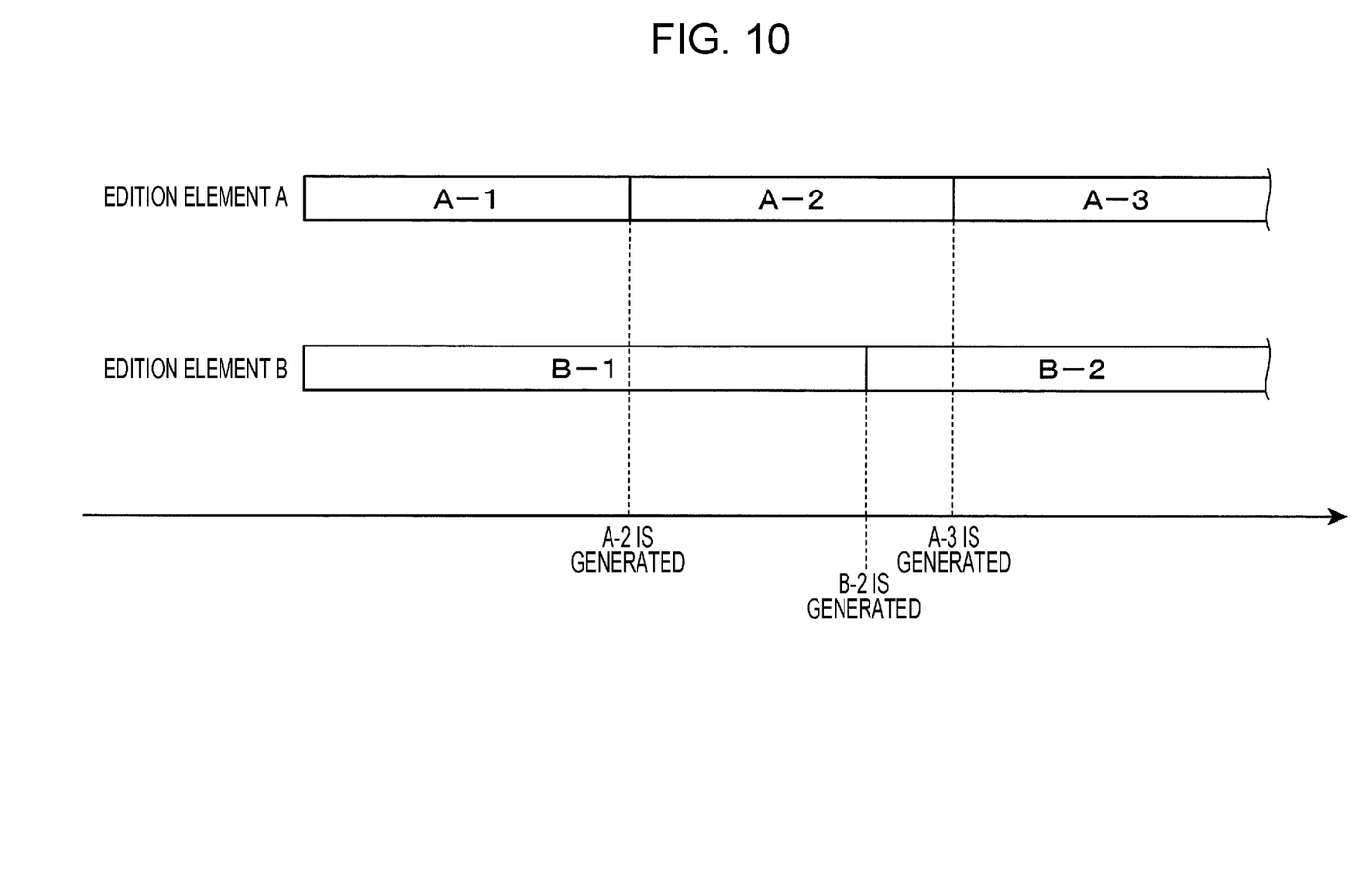
FIG. 10 illustrates an example of correspondence between edition elements based on versions.

FIG. 10 illustrates an example of correspondence between edition elements based on versions. In the example illustrated in FIG. 10, the contents of an edition element A and the contents of an edition element B are edited individually. The edition element A has three versions of A-1, A-2, and A-3 and the edition element B has two versions of B-1 and B-2. It is assumed that all the versions of the edition elements A and B are unapproved.

It is assumed that approval is requested while the edition element A-2 is set as a target edition element. Referring to FIG. 10, the contents of the edition element B are edited and the edition element B-2 is generated after the edition element A-2 has been generated. That is, the version of the edition element B is B-1 when the edition element A-2 is generated. Thus, when the edition element B is included in the approval range, the edition element B-1 is identified as a related edition element instead of the latest edition element B-2.

In the example described above, all the versions of the edition elements A and B are unapproved but, if the edition element B-1 is approved, the identification of the edition element B as the related edition element depends on the version of the edition element A specified as the target edition element. For example, when the edition element A-2 is the target edition element as described above, the version of the edition element B corresponding to the edition element A-2 is B-1 that is an approved version. Therefore, the edition element B-1 is not the related edition element. When the edition element A-3 is the target edition element, the version of the edition element B corresponding to the edition element A-3 is B-2 that is an unapproved version. Therefore, the edition element B-2 is the related edition element.

In the exemplary embodiment described above, the document management server 10 holds and manages the document files and the document information. A document server that holds the document files may be provided separately from the document management server 10 and the document management server 10 may manage the document information alone.

In the exemplary embodiment described above, the approval range identifying part 14 of the document management server 10 identifies the approval range and the related edition element in relation to the target edition element. When the target edition element is specified, the client terminal 20 may identify the related edition element and request approval for the target edition element and the related edition element.

In the exemplary embodiment described above, two rules based on the positional relationship between the edition elements in the document structure (Rule 1 and Rule 2) and one rule based on the link relationship between the edition elements (Rule 3) are described as the rules for identifying the approval range. It is not always necessary to apply all the rules. The rule to be applied may be selected based on the types and contents of the document file and the specifications and operational settings of the document management system 100. In the exemplary embodiment described above, in Rule 3, the edition element of the destination of the link is not limited to an edition element of the same document file as that of the target edition element but may be an edition element of a different document file. Instead, the destination of the link may be limited to the same document, a specific document, or an edition element at a specific level of hierarchy in the document structure. In the exemplary embodiment described above, the direction of the link is not limited in the link relationship of Rule 3 but only the destination of a link from the target edition element to another edition element may be included in the approval range. The rules for identifying the approval range are not limited to the rules described above. The rules for identifying the approval range may be set by using relationships between various edition elements identified based on the document structure.

When approval of an approver is requested, a notification for requesting an approval operation while specifying a detailed approval method may be provided in addition to the notification of a message for simply requesting approval for the edited document file (edition element). For example, the document file may be displayed actually or a difference before and after the editing operation may be provided so as to request viewing of the edited contents.

Figure 11:
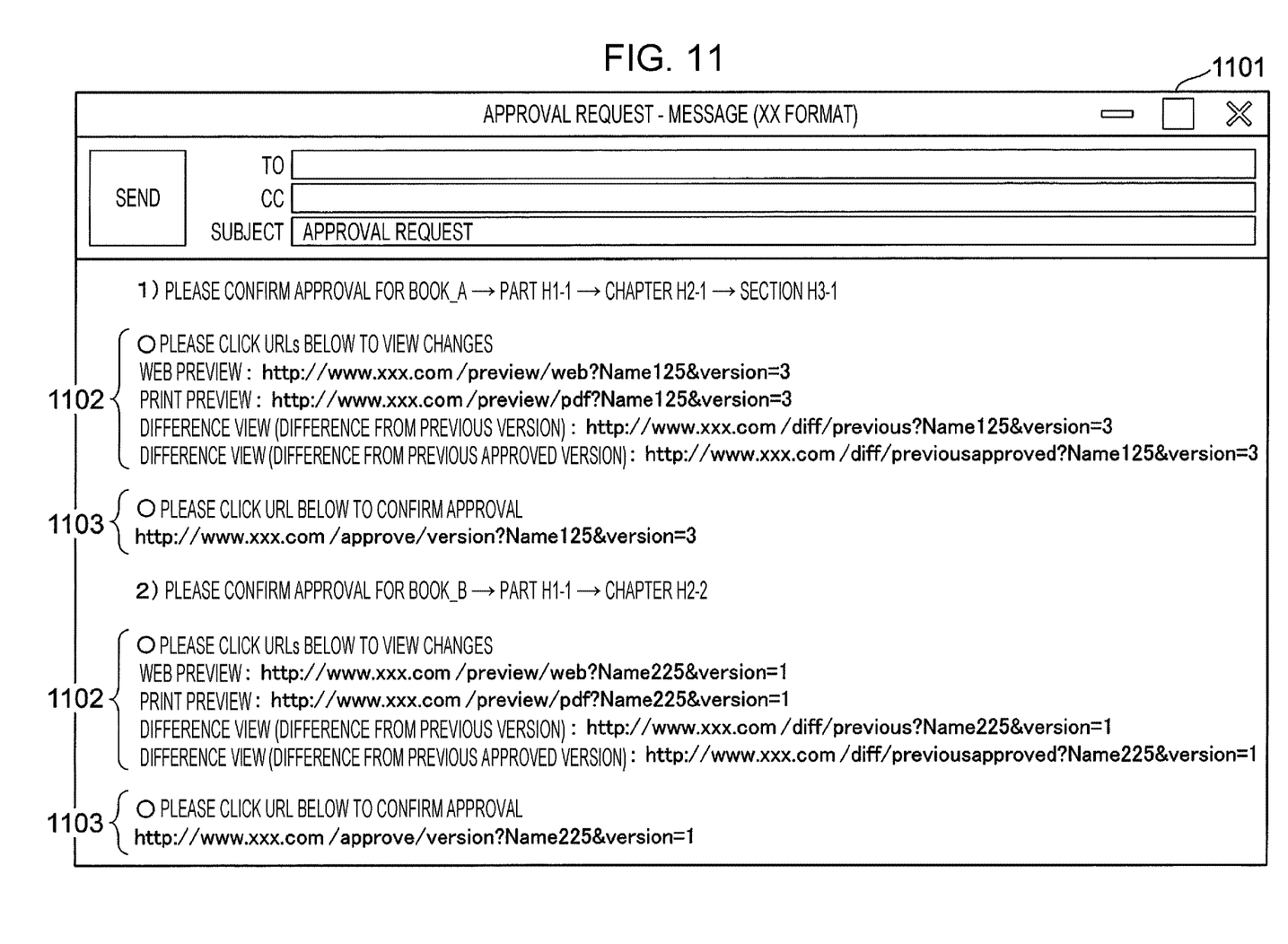
FIG. 11 illustrates an example of a notification of approval requests using electronic mail.

FIG. 11 illustrates an example of a notification of approval requests using electronic mail. A display screen 1101 illustrated in FIG. 11 is a display screen of electronic mail to be transmitted to an information terminal of an approver. In the example illustrated in FIG. 11, the contents of a section "H3-1" of a chapter "H2-1" of a part "H1-1" of a document file "BOOK_A" and the contents of a chapter "H2-2" of a part "H1-1" of a document file "BOOK_B" are edited and approval of the approver is requested. In the example illustrated in FIG. 11, a viewing request field 1102 and an approval request field 1103 are displayed for each edition element that is an approval target. The viewing request field 1102 shows uniform resource locators (URLs) of links to "WEB PREVIEW" to be used for viewing an image of edited contents on a screen of the display device, "PRINT PREVIEW" to be used for viewing an image of the edited contents to be output by printing, "DIFFERENCE VIEW (DIFFERENCE FROM PREVIOUS VERSION)" indicating a difference from a version before the editing operation in order to view the edited contents, and "DIFFERENCE VIEW (DIFFERENCE FROM PREVIOUS APPROVED VERSION)" indicating a difference from an approved version before the editing operation. The approval request field 1103 shows a URL of a link to a page for an approval operation. When the approver receives this electronic mail, the approver makes a reference to the views of the links shown in the viewing request field 1102 and performs the approval operation in the page of the link shown in the approval request field 1103. Thus, the approval status of the edition element is changed from "unapproved" to "approved".

This exemplary embodiment is directed to the exemplary case in which approval is requested for the edition element in which the contents are edited. The application of the document management system 100 of this exemplary embodiment is not limited to the approval request for the edition element. This exemplary embodiment is widely applicable to a case in which a notification is provided to users who share a document or to a specific user regarding an edition element that satisfies a specific condition.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management apparatus, comprising:
a display that displays a document structure in which an edition element of a document to be edited is identifiable, the edition element being a portion of the document that serves as an element of editing work, the edition element being one of a plurality of edition elements of the document;
a specifying operation receiving part that receives an operation of specifying the edition element based on the document structure displayed on the display; and
a notification controller that provides a notification to a notification destination associated with the edition element specified through the operation received by the specifying operation receiving part, wherein
the notification includes an approval request requesting approval to edit the edition element, and
when the edition element has plural versions, the notification includes the approval request for the respective versions.

2. The document management apparatus according to claim 1, wherein the display displays the document structure by using a tree diagram that represents a structure of the document.

3. The document management apparatus according to claim 2, wherein the notification controller adds, as a notification target, an edition element corresponding to a node having a specific relationship in the tree diagram with a node in the tree diagram that corresponds to the edition element specified through the operation received by the specifying operation receiving part.

4. The document management apparatus according to claim 3,
wherein the display displays a confirmation view to be used for confirming whether to provide a notification to a notification destination associated with the edition element added as the notification target by the notification controller, and
wherein the notification controller provides the notification to the notification destination associated with the edition element added as the notification target based on a response to the confirmation view.

5. The document management apparatus according to claim 1, wherein the notification controller adds, as a notification target, a different edition element associated with the edition element specified through the operation received by the specifying operation receiving part.

6. The document management apparatus according to claim 5,
wherein the display displays a confirmation view to be used for confirming whether to provide a notification to a notification destination associated with the different edition element added as the notification target by the notification controller, and
wherein the notification controller provides the notification to the notification destination associated with the different edition element added as the notification target based on a response to the confirmation view.

7. A document management system, comprising:
a document management unit that manages an edition element of a document to be edited and information related to approval for the edition element, the edition element being a portion of the document that serves as an element of editing work, the edition element being one of a plurality of edition elements of the document;

a specifying operation receiving unit that receives an operation of specifying the edition element subjected to the editing work; and a notification controller that provides a notification of an approval request to an approver of the edition element specified through the operation received by the specifying operation receiving unit and identified by the information related to approval; wherein when the edition element has plural versions, the notification includes the approval request for the respective versions.

8. The document management system according to claim 7, wherein the notification controller adds, as a notification target of the approval request, a different edition element that is associated, based on the information managed by the document management unit, with the edition element specified through the operation received by the specifying operation receiving unit.

9. The document management system according to claim 8, wherein the different edition element added as the notification target of the approval request includes an edition element included in a document different from the document that includes the edition element specified through the operation received by the specifying operation receiving unit.

10. The document management system according to claim 7, further comprising a confirmation unit that prompts, when a different unapproved edition element that is associated, based on the information managed by the document management unit, with the edition element specified through the operation received by the specifying operation receiving unit is present, an operator to confirm whether to request approval for the different unapproved edition element.

11. The document management system according to claim 10, wherein, when the confirmation unit has received a command to request approval for the different unapproved edition element, the notification controller provides a notification of the approval request to an approver of the different unapproved edition element identified by the information related to approval.

12. A non-transitory computer readable medium storing a program causing a computer to execute a process comprising:

displaying, on a display device, a document structure diagram in which an edition element of a document to be edited is identifiable, the edition element being a portion of the document that serves as an element of editing work, the edition element being one of a plurality of edition elements of the document;

receiving an operation of specifying the edition element based on the document structure diagram displayed on the display device; and providing a notification to a notification destination associated with the edition element specified through the received operation, wherein the notification includes an approval request requesting approval to edit the edition element, and when the edition element has plural versions, the notification includes the approval request for the respective versions.

* * * * *